(12) United States Patent
Gordon

(10) Patent No.: US 11,241,845 B2
(45) Date of Patent: Feb. 8, 2022

(54) METHOD AND SYSTEM FOR MANUFACTURING NOODLES OF STRUCTURAL JOINTS

(71) Applicant: The Boeing Company, Chicago, IL (US)

(72) Inventor: Christian Gordon, Melbourne (AU)

(73) Assignee: The Boeing Company, Chicago, IL (US)

( * ) Notice: Subject to any disclaimer, the term of this patent is extended or adjusted under 35 U.S.C. 154(b) by 0 days.

(21) Appl. No.: 16/878,351

(22) Filed: May 19, 2020

(65) Prior Publication Data

US 2020/0276772 A1 Sep. 3, 2020

Related U.S. Application Data

(62) Division of application No. 15/642,585, filed on Jul. 6, 2017, now Pat. No. 10,703,053.

(51) Int. Cl.
*B29C 70/34* (2006.01)
*B29C 70/54* (2006.01)
(Continued)

(52) U.S. Cl.
CPC .............. *B29C 70/34* (2013.01); *B29B 11/16* (2013.01); *B29C 65/4815* (2013.01);
(Continued)

(58) Field of Classification Search
CPC ........ B32B 2260/046; B32B 2260/023; B32B 5/26; B32B 2307/732; B32B 7/12;
(Continued)

(56) References Cited

U.S. PATENT DOCUMENTS 9,415,577 B1 * 8/2016 Sutkus ............... B29D 99/0003
2014/0069258 A1 3/2014 Anderson et al.
(Continued)

FOREIGN PATENT DOCUMENTS

CN 1671539 9/2005
CN 103085291 5/2013
(Continued)

OTHER PUBLICATIONS

First Office Action for Chinese Patent Application No. 2018105666394 dated Jun. 2, 2021.

*Primary Examiner* — Vishal I Patel
(74) *Attorney, Agent, or Firm* — Kunzler Bean & Adamson

(57) ABSTRACT

A method of manufacturing a noodle of a structural joint that comprises pulling a first composite sheet through a first splitting station to cut the first composite sheet into a plurality of first composite plies, pulling the plurality of first composite plies through a first alignment station to stack the plurality of first composite plies on top of each other to form a first stacked composite layup, pulling the first stacked composite layup through a first heating station to heat the first stacked composite layup to form a first heated composite layup, pulling the first heated composite layup through a first forming station to shape the first heated composite layup into a first pre-selected cross-sectional shape to form at least a first portion of a continuous noodle, and pulling at least the first portion of the continuous noodle through a cutting station to cut at least the first portion of the continuous noodle to a pre-selected length.

20 Claims, 9 Drawing Sheets

(51) Int. Cl.
    *B29C 65/48*         (2006.01)
    *B32B 3/28*          (2006.01)
    *B32B 37/14*        (2006.01)
    *B29B 11/16*        (2006.01)
    *B29D 99/00*        (2010.01)
    *B29C 70/52*        (2006.01)
    *B29L 31/30*        (2006.01)

(52) U.S. Cl.
    CPC ............ *B29C 70/52* (2013.01); *B29C 70/545* (2013.01); *B29D 99/0003* (2013.01); *B32B 3/28* (2013.01); *B32B 37/142* (2013.01); *B29C 2793/0036* (2013.01); *B29C 2793/0063* (2013.01); *B29L 2031/3082* (2013.01)

(58) Field of Classification Search
    CPC ............ B32B 37/142; B32B 2250/44; B32B 2250/20; B32B 3/28; B32B 2605/18; B32B 5/12; B29C 70/34; B29C 70/52; B29C 70/545; B29C 2793/0063; B29C 65/4815; B29C 2793/0036; B29B 11/16; B29D 99/0003; Y02T 50/40; B29L 2031/3082
    See application file for complete search history.

(56) References Cited

U.S. PATENT DOCUMENTS

| | | | |
|---|---|---|---|
| 2014/0069586 A1* | 3/2014 | Anderson | B32B 37/0046 156/499 |
| 2015/0224683 A1 | 8/2015 | Hansen et al. | |
| 2018/0093431 A1 | 4/2018 | Forston et al. | |

FOREIGN PATENT DOCUMENTS

| | | |
|---|---|---|
| CN | 103182783 | 7/2013 |
| CN | 104786525 | 7/2015 |
| CN | 106457699 | 2/2017 |

\* cited by examiner

METHOD AND SYSTEM FOR MANUFACTURING NOODLES OF STRUCTURAL JOINTS

FIELD

This disclosure relates generally to manufacturing parts for a complex structure, and more particularly to manufacturing a noodle for a structural joint of a complex structure.

BACKGROUND

Noodles are used to fill gaps in structural joints of complex structures, such as aircraft. In some structural joints, such as those formed between layers of composite material, a gap may be formed between the layers. To strengthen and improve the performance of the structural joint, a noodle is positioned within the gap of the structural joint.

Some noodles are formed of a stack of plies, each made of a composite material. Often, the gap has a cross-sectional shape with a narrow tip. Manufacturing a noodle, made from a stack of plies of composite material, to have a narrow tip can be difficult. Conventional manufacturing processes includes separating the manufacturing of a base of the noodle from the manufacturing of a tip of the noodle, often using different types of manufacturing processes. Then, in a subsequent assembly step, the pre-made tip is attached to the pre-made base to complete the noodle. Furthermore, conventional manufacturing processes are not automated, but require manual cutting and aligning of individual plies and manual attaching of tips and bases, which can be cumbersome, labor-intensive, and time-consuming.

SUMMARY

The subject matter of the present application has been developed in response to the present state of the art, and in particular, in response to the shortcomings of current noodle manufacturing techniques, that have not yet been fully solved. Accordingly, the subject matter of the present application has been developed to provide a method and system for manufacturing noodles, of structural joints, that overcome at least some of the above-discussed shortcomings of prior art techniques.

Disclosed herein is a method of manufacturing a noodle of a structural joint. The method comprises pulling a first composite sheet through a first splitting station to cut the first composite sheet into a plurality of first composite plies. The method also comprises pulling the plurality of first composite plies through a first alignment station to stack the plurality of first composite plies on top of each other to form a first stacked composite layup. The method further comprises pulling the first stacked composite layup through a first heating station to heat the first stacked composite layup to form a first heated composite layup. The method additionally comprises pulling the first heated composite layup through a first forming station to shape the first heated composite layup into a first pre-selected cross-sectional shape to form at least a first portion of a continuous noodle. The method also comprises pulling at least the first portion of the continuous noodle through a cutting station to cut at least the first portion of the continuous noodle to a pre-selected length. The preceding subject matter of this paragraph characterizes example 1 of the present disclosure.

The method further comprises pulling a second composite sheet through a second splitting station to cut the second composite sheet into a plurality of second composite plies. The method additionally comprises pulling the plurality of second composite plies through a second alignment station to stack the plurality of second composite plies on top of each other to form a second stacked composite layup. The method additionally comprises pulling the second stacked composite layup through a second heating station to heat the second stacked composite layup to form a second heated composite layup. The method also comprises pulling the second heated composite layup through a second forming station to shape the second heated composite layup into a second pre-selected cross-sectional shape to form an intermediate composite layup. The method further comprises pulling the intermediate composite layup through the first heating station to heat the intermediate composite layup to form a heated intermediate composite layup. The method additionally comprises pulling the heated intermediate composite layup through the first forming station to couple together the heated intermediate composite layup and the first heated composite layup and shape the intermediate composite layup into a third pre-selected cross-sectional shape to form at least a second portion of the continuous noodle. The method also comprises pulling at least the second portion of the continuous noodle, together with at least the first portion of the continuous noodle, through the cutting station to concurrently cut at least the first portion and the second portion of the continuous noodle to the pre-selected length. The preceding subject matter of this paragraph characterizes example 2 of the present disclosure, wherein example 2 also includes the subject matter according to example 1, above.

The method further comprises pulling the first stacked composite layup and the intermediate composite layup through a third alignment station to stack the intermediate composite layup onto the first stacked composite layup before pulling the first stacked composite layup and the intermediate composite layup through the first heating station. The preceding subject matter of this paragraph characterizes example 3 of the present disclosure, wherein example 3 also includes the subject matter according to example 2, above.

The method further comprises pulling at least the first portion and the second portion of the continuous noodle through a first cooling station to rapidly cool at least the first portion and the second portion of the continuous noodle. The method additionally comprises pulling the second heated composite layup through a second cooling station to rapidly cool the intermediate composite layup. The preceding subject matter of this paragraph characterizes example 4 of the present disclosure, wherein example 4 also includes the subject matter according to examples 2 or 3, above.

The first composite sheet comprises multiple layers, each comprising first unidirectional fibers. A direction of the first unidirectional fibers of each one of the multiple layers is different than a direction of the first unidirectional fibers of any other one of the multiple layers. The second composite sheet comprises a single layer, comprising second unidirectional fibers. The preceding subject matter of this paragraph characterizes example 5 of the present disclosure, wherein example 5 also includes the subject matter according to any one of examples 2-4, above.

A direction of the second unidirectional fibers is different than the direction of the first unidirectional fibers of any one of the multiple layers. The preceding subject matter of this paragraph characterizes example 6 of the present disclosure, wherein example 6 also includes the subject matter according to example 5, above.

The first portion of the continuous noodle comprises a base of the noodle. The second portion of the continuous noodle comprises a tip of the noodle. The preceding subject matter of this paragraph characterizes example 7 of the present disclosure, wherein example 7 also includes the subject matter according to any one of examples 2-6, above.

The first composite sheet comprises unidirectional fibers separated from each other by a thermoplastic adhesive. The first heating station heats the first stacked composite layup to a melting temperature of the thermoplastic adhesive. The preceding subject matter of this paragraph characterizes example 8 of the present disclosure, wherein example 8 also includes the subject matter according to any one of examples 1-7, above.

Each of the plurality of first composite plies has a width different than the width of the others of the plurality of first composite plies. The first alignment station stacks the plurality of first composite plies on top of each other in descending order based on width. The preceding subject matter of this paragraph characterizes example 9 of the present disclosure, wherein example 9 also includes the subject matter according to any one of examples 1-8, above.

pulling at least the first portion of the continuous noodle through the cutting station causes the first composite sheet to be pulled through the first splitting station, the plurality of first composite plies to be pulled through the first alignment station, the first stacked composite layup to be pulled through the first heating station, and the first heated composite layup to be pulled through the first forming station. The preceding subject matter of this paragraph characterizes example 10 of the present disclosure, wherein example 10 also includes the subject matter according to any one of examples 1-9, above.

The method further comprises infusing resin into at least the first portion of the continuous noodle cut to the pre-selected length. The method additionally comprises curing the resin. The preceding subject matter of this paragraph characterizes example 11 of the present disclosure, wherein example 11 also includes the subject matter according to any one of examples 1-10, above.

Also disclosed herein is a system for manufacturing a noodle of a structural joint. The system comprises a first splitting station configured to cut a first composite sheet into a plurality of first composite plies, each having a different width, as the first composite sheet is advanced through the first splitting station. The system also comprises a first alignment station configured to stack the plurality of first composite plies on top of each other to form a first stacked composite layup as the plurality of first composite plies is advanced through the first alignment station. The system further comprises a first heating station configured to heat the first stacked composite layup to form a first heated composite layup as the first stacked composite layup is advanced through the first heating station. The system additionally comprises a first forming station configured to shape the first heated composite layup into a first pre-selected cross-sectional shape to form at least a first portion of a continuous noodle as the first heated composite layup is advanced through the first forming station. The system also comprises a cutting station configured to cut at least the first portion of the continuous noodle to a pre-selected length. The preceding subject matter of this paragraph characterizes example 12 of the present disclosure.

The system further comprises a second splitting station configured to cut a second composite sheet into a plurality of second composite plies as the second composite sheet is advanced through the second splitting station. The system additionally comprises a second alignment station configured to stack the plurality of second composite plies on top of each other to form a second stacked composite layup as the plurality of second composite plies are advanced through the second splitting station. The system also comprises a second heating station configured to heat the second stacked composite layup to form a second heated composite layup as the second stacked composite layup is advanced through the second heating station. The system additionally comprises a second forming station configured to shape the second heated composite layup into a second pre-selected cross-sectional shape to form an intermediate composite layup as the second heated composite layup is advanced through the second forming station. The first heating station is further configured to heat the intermediate composite layup to form a heated intermediate composite layup as the intermediate composite layup is advanced through the first heating station. The first forming station is further configured to couple together the heated intermediate composite layup and the first heated composite layup and shape the intermediate composite layup into a third pre-selected cross-sectional shape to form at least a second portion of the continuous noodle as the heated intermediate composite layup and the first heated composite layup are advanced through the first forming station. The cutting station is further configured to concurrently cut at least the first portion and the second portion of the continuous noodle to the pre-selected length. The preceding subject matter of this paragraph characterizes example 13 of the present disclosure, wherein example 13 also includes the subject matter according to example 12, above.

The system further comprises a third alignment station configured to stack the intermediate composite layup onto the first stacked composite layup as the intermediate composite layup and the first stacked composite layup advance through the third alignment station. The preceding subject matter of this paragraph characterizes example 14 of the present disclosure, wherein example 14 also includes the subject matter according to example 13, above.

The system further comprises a first cooling station configured to rapidly cool at least the first portion and the second portion of the continuous noodle. They system additionally comprises a second cooling station configured to rapidly cool the second heated composite layup. The preceding subject matter of this paragraph characterizes example 15 of the present disclosure, wherein example 15 also includes the subject matter according to examples 13 or 14, above.

The second forming station comprises a fixed orifice die. The preceding subject matter of this paragraph characterizes example 16 of the present disclosure, wherein example 16 also includes the subject matter according to any one of examples examples 13-15, above.

The system further comprises a pull motor configured to concurrently advance the first composite sheet through the first splitting station, the plurality of first composite plies through the first alignment station, the first stacked composite layup and the intermediate composite layup through the first heating station, the first heated composite layup and the heated intermediate composite layup through the first forming station, the second composite sheet through the second splitting station, the plurality of second composite plies through the second splitting station, the second stacked composite layup through the second heating station, the second heated composite layup through the second forming station, and the continuous noodle through the cutting station. The preceding subject matter of this paragraph characterizes example 17 of the present disclosure, wherein example 17 also includes the subject matter according to any one of examples 13-16, above.

The system further comprises a tow cable, comprising a first end coupleable to the continuous noodle and a second end, opposite the first end, coupled to the pull motor. The pull motor is configured to concurrently advance the first composite sheet through the first splitting station, the plurality of first composite plies through the first alignment station, the first stacked composite layup and the intermediate composite layup through the first heating station, the first heated composite layup and the heated intermediate composite layup through the first forming station, the second composite sheet through the second splitting station, the plurality of second composite plies through the second splitting station, the second stacked composite layup through the second heating station, the second heated composite layup through the second forming station, and the continuous noodle through the cutting station by pulling the tow cable. The preceding subject matter of this paragraph characterizes example 18 of the present disclosure, wherein example 18 also includes the subject matter according to example 17, above.

The cutting station is adjustable to adjust the pre-selected length. The preceding subject matter of this paragraph characterizes example 19 of the present disclosure, wherein example 19 also includes the subject matter according to any one of examples 12-18, above.

The first forming station comprises a rolling die. The preceding subject matter of this paragraph characterizes example 20 of the present disclosure, wherein example 20 also includes the subject matter according to any one of examples 12-19, above.

The described features, structures, advantages, and/or characteristics of the subject matter of the present disclosure may be combined in any suitable manner in one or more embodiments and/or implementations. In the following description, numerous specific details are provided to impart a thorough understanding of embodiments of the subject matter of the present disclosure. One skilled in the relevant art will recognize that the subject matter of the present disclosure may be practiced without one or more of the specific features, details, components, materials, and/or methods of a particular embodiment or implementation. In other instances, additional features and advantages may be recognized in certain embodiments and/or implementations that may not be present in all embodiments or implementations. Further, in some instances, well-known structures, materials, or operations are not shown or described in detail to avoid obscuring aspects of the subject matter of the present disclosure. The features and advantages of the subject matter of the present disclosure will become more fully apparent from the following description and appended claims, or may be learned by the practice of the subject matter as set forth hereinafter.

BRIEF DESCRIPTION OF THE DRAWINGS

In order that the advantages of the subject matter may be more readily understood, a more particular description of the subject matter briefly described above will be rendered by reference to specific embodiments that are illustrated in the appended drawings. Understanding that these drawings depict only typical embodiments of the subject matter and are not therefore to be considered to be limiting of its scope, the subject matter will be described and explained with additional specificity and detail through the use of the drawings, in which.

DETAILED DESCRIPTION

Reference throughout this specification to "one embodiment," "an embodiment," or similar language means that a particular feature, structure, or characteristic described in connection with the embodiment is included in at least one embodiment of the present disclosure. Appearances of the phrases "in one embodiment," "in an embodiment," and similar language throughout this specification may, but do not necessarily, all refer to the same embodiment. Similarly, the use of the term "implementation" means an implementation having a particular feature, structure, or characteristic described in connection with one or more embodiments of the present disclosure, however, absent an express correlation to indicate otherwise, an implementation may be associated with one or more embodiments.

Figure 1:
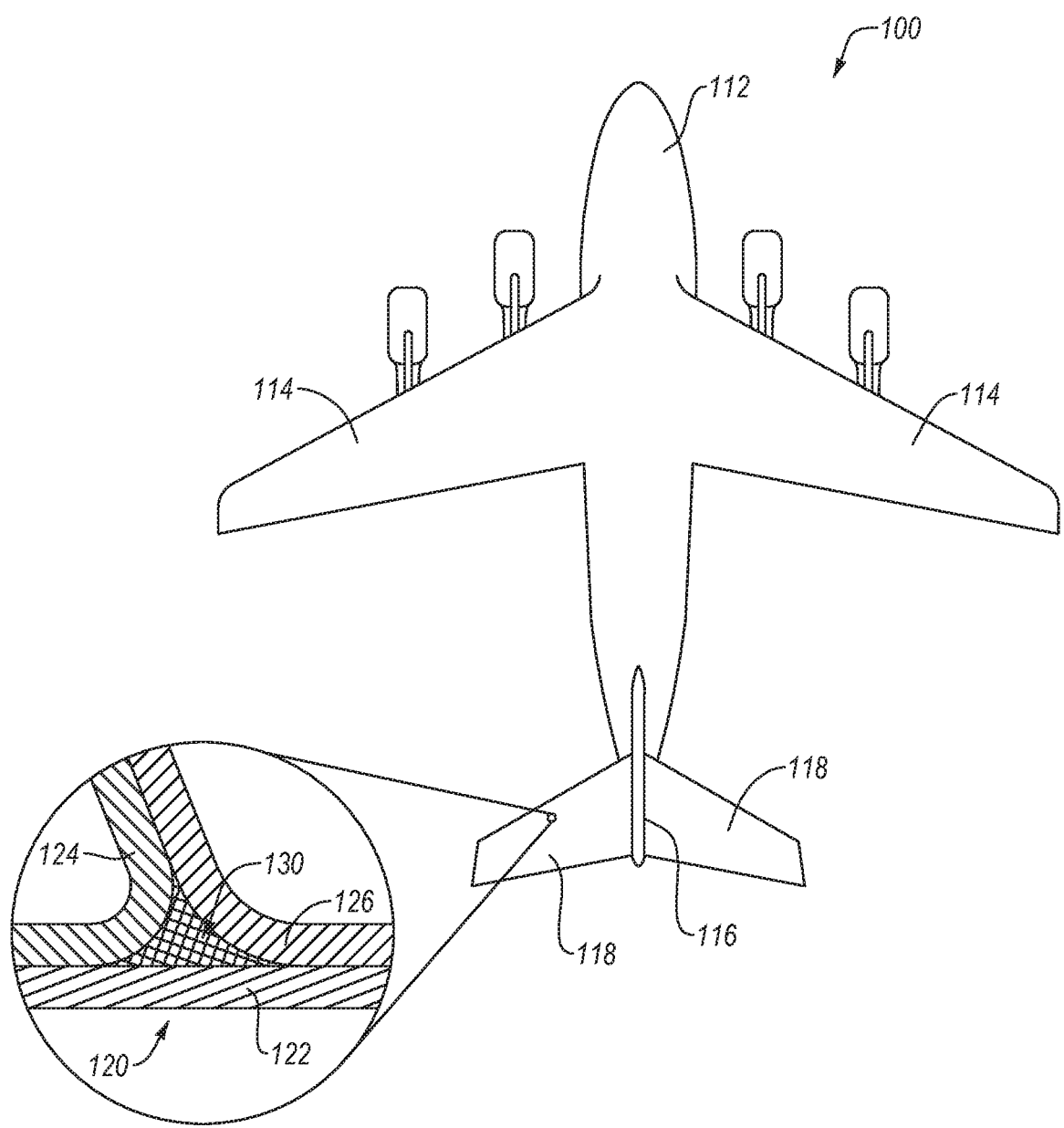
FIG. 1 is a top plan view of an aircraft showing a detailed cross-sectional view of a structural joint of the aircraft, according to one or more examples of the present disclosure.

Referring to FIG. 1, one embodiment of an aircraft 100 is shown. The aircraft 100 can be any of various aircraft, such as commercial aircraft used for the transportation of passengers, military aircraft for military operations, personal aircraft, and the like. Moreover, although an aircraft is depicted in the illustrated embodiments, in other embodiments, another complex structure, such as a vehicle (e.g., helicopter, boat, spacecraft, automobile, etc.) or non-mobile complex structure (e.g., building, bridge, machinery, etc.) can be used. As defined herein, a complex structure includes any multi-component structures in a fully operative state to fulfill the intended purpose of the structure.

The aircraft 100 includes a body 112 (e.g., fuselage), a pair of wings 114 coupled to and extending from the body 112, a vertical stabilizer 116 coupled to the body 112, and a pair of horizontal stabilizers 118 coupled to the body and/or the vertical stabilizer 116. As presented above, the aircraft 100 can be any of various types of aircraft, such as a passenger airplane, a fighter jet, a helicopter, spacecraft, and the like. As depicted, the aircraft 100 represents a passenger airplane.

Generally, the body 112, wings 114, vertical stabilizer 116, and horizontal stabilizers 118 of the aircraft 100 each includes an internal frame enveloped by a cover or skin. The cover is coupled to the frame to form an exterior shell of the aircraft. Most commonly, the cover is coupled to the frame using a plurality of fasteners that extend through the cover and engage the frame. For sealing, insulation, electrical conduction, and/or aesthetic effects, one or more additional components can be coupled to an exterior of the cover. For example, one or more coatings can be applied onto the cover. The coatings can include one or more of a sealant coating, made from any of various materials, such as an insulation material and/or dielectric material, a paint coating, a conductive material coating, or a coating embedded with structural components, such as a conductive mesh or layer.

One or both of the cover and internal frame can be made from one or more layers of a composite fiber material (i.e., fiber-reinforced polymer). The composite fiber material includes a curable thermoset matrix, such as a polymer-based matrix, with reinforced fibers, such as carbon-based fibers, glass-based fibers, and the like. The layers of composite fiber material may be coupled together to form a structural joint, such as structural joint 120 in FIG. 1. Generally, a structural joint in the cover or frame of the aircraft 100 is formed by adjoining at least two layers of uncured composite fiber material. In other words, a structural joint is defined at the intersection of at least two intercoupled layers. If not pre-impregnated with resin (e.g., epoxy), the composite fiber material of the at least two layers is infused with resin. Subsequently, the at least two layers are co-cured by heating the layers to at least a curing temperature of the resin, which thermally sets or hardens the resin. However, if the at least two layers are pre-impregnated, resin does not need to be added to the layers and the layers are simply cured in place.

According to one embodiment, as shown in the detailed view of FIG. 1, the structural joint 120 is formed at the intersection of layers 122, 124, 126 or where the layers 122, 124, 126 are intercoupled together. Each layer 122, 124, 126 is made from a fiber reinforced polymer or a fibrous material embedded in a matrix in some implementations. The layers 122, 124, 126 of the structural joint 120 may have any of various thicknesses, compositions, and configurations. For example, each layer 122, 124, 126 can include multiple sub-layers or sheets of composite fiber material to form a laminate layer. The fibers of each sub-layer can be oriented in the same or a different direction relative to each other. Further, the layers 122, 124, 124, and the structural joint 120 formed therefrom, may form part of any of various structural features of the aircraft 100. For example, in one implementation, the layer 122 may act as an outer layer (e.g., cover) of the aircraft 100, and the layers 124, 126 may act as inner layers (e.g., frame) of the aircraft. In other implementations, all the layers 122, 124, 126 act as outer layers of the aircraft, or all of the layers 122, 124, 126 act as inner layers of the aircraft.

Figure 3:
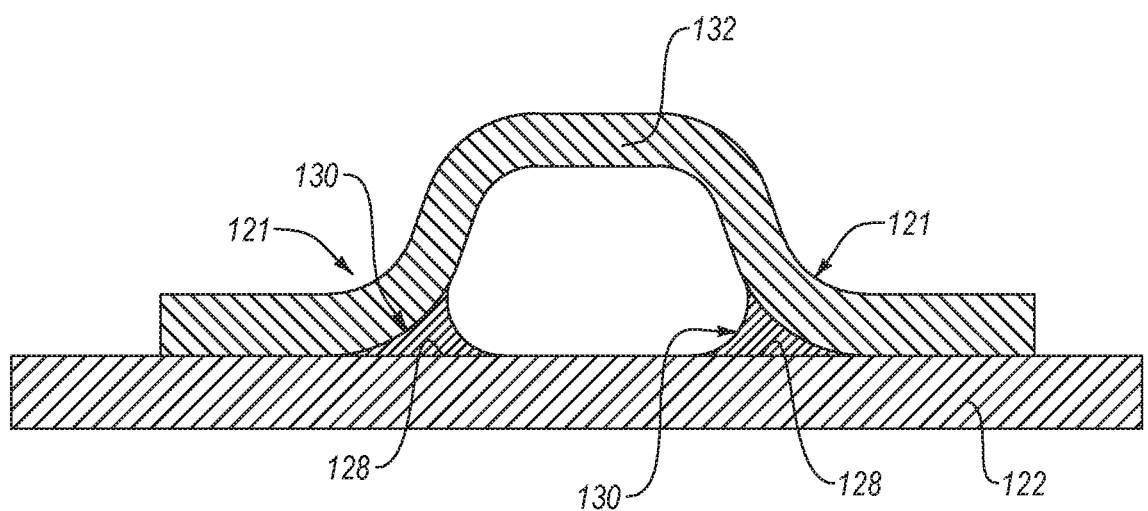
FIG. 3 is a cross-sectional end view of a structural joint, according to one or more examples of the present disclosure.

In one particular implementation, joints 121 help form a top hat section or stiffener cap section of an aircraft 100. For example, as shown in FIG. 3, the structural joints 121 are formed at opposing intersections of a top hat layer 132 and a layer 122. The top hat layer 132 may extend longitudinally along a length of the body 112, the wing 114, the vertical stabilizer 116, or the horizontal stabilizer 118.

Generally, the structural joint 120 and the structural joint 121 includes at least one bent portion of at least one layer. Due to the bend of the at least one layer, when the layers of the structural joint 120 or the structural joint 121 are adjoined together, a gap 128 or space is defined between the bend of the at least one layer and another one or more of layers. In the particular implementation of FIG. 1, the gap 128 is defined between a first bend in the layer 124, a second bend in the layer 126, and the layer 122. The gap 128 has a cross-sectional shape defined by the layers of the structural joint. Moreover, sharpness or the radius of the bend or bends in the layers defines the shape of the gap 128. In the illustrated embodiments of FIGS. 1 and 3, the gap 128 has a generally triangular cross-sectional shape. The bend or bends of the layers forming the structural joint 120 or the structural joint 121 can be curved to have any of various radii of curvature. For example, in some implementations, two layers forming the structural joint are bent to the same degree, such that the cross-sectional shape of the gap 128 is symmetrical. However, as shown in FIGS. 1 and 3, in certain implementations, two layers forming the structural joint are bent at different degrees, such that the cross-sectional shape of the gap 128 is asymmetrical.

Figure 2:
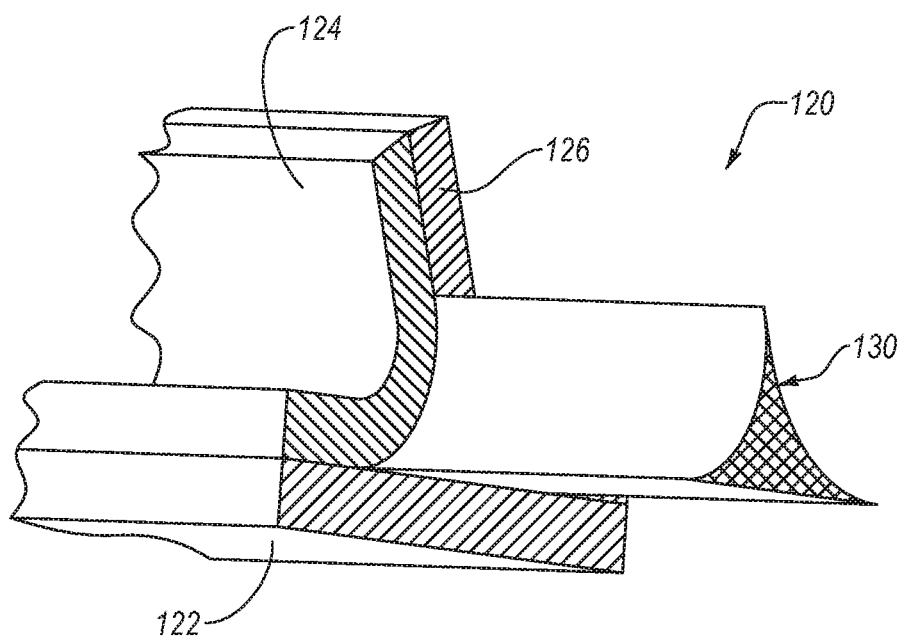
FIG. 2 is a cross-sectional perspective view of the structural joint of the aircraft shown in FIG. 1, according to one or more examples of the present disclosure.

Referring to FIGS. 1 and 2, the structural joint 120 further includes a noodle 130 that is located or positioned within the gap 128. Because the noodle 130 at least partially fills the gap 128, the noodle 130 can be defined as a filler. In certain implementations, the noodle 130 is closely fitted within the gap 128 such that the noodle 130 has the same cross-sectional shape as the gap 128. More specifically, the layers 122, 124, 126, in a pre-cured state, are laid up about the noodle 130, which is pre-formed relative to the formation of the structural joint 120. Accordingly, the noodle 130 effectively defines the shape of the gap 128, thus filling the entirety of the gap 128. Although the structural joint 120 and the structural joint 121 shown in the embodiments of FIGS. 1-3 include a noodle 130 with a generally triangular cross-sectional shape, in other embodiments, the noodle 130 can have a cross-sectional shape other than triangular. For example, some joints may be formed by more than three layers such that the gap 128 and associated noodle 130 have a polygonal cross-sectional shape with four or more sides.

After laying up the layers 122, 124, 126 about the noodle 130, resin can be infused into the noodle 130 along with the layers 122, 124, 126. Then, the resin infused into the noodle 130, together with the resin infused into the layers 122, 124, 126, can be concurrently cured to bond the layers 122, 124, 126 to the noodle 130 and permanently form the structural joint 120. The noodle 130 provides support to the layers 122, 124, 126, which increases the overall strength of the structural joint 120 and improves the stiffness of the structural joint 120. Further, the noodle 130 can help mitigate the formation of micro-cracks and macro-cracks in the layers 122, 124, 126 forming the structural joint 120.

As described above, the noodle 130 is pre-formed before assembly of the structural joint 120 based on the desired size and shape of the gap 128. In other words, prior to the layers 122, 124, 126 being brought together and cured about the noodle 130 to form the structural joint 120, a desired size and shape of the gap 128 is determined, and the noodle 130 is made according to the desired size and shape of the gap 128. The desired size and shape of the gap 128 is based on the desired number of layers forming the structural joint 120 and the desired bend or lack of bend in the layers forming the structural joint 120.

Figure 4:
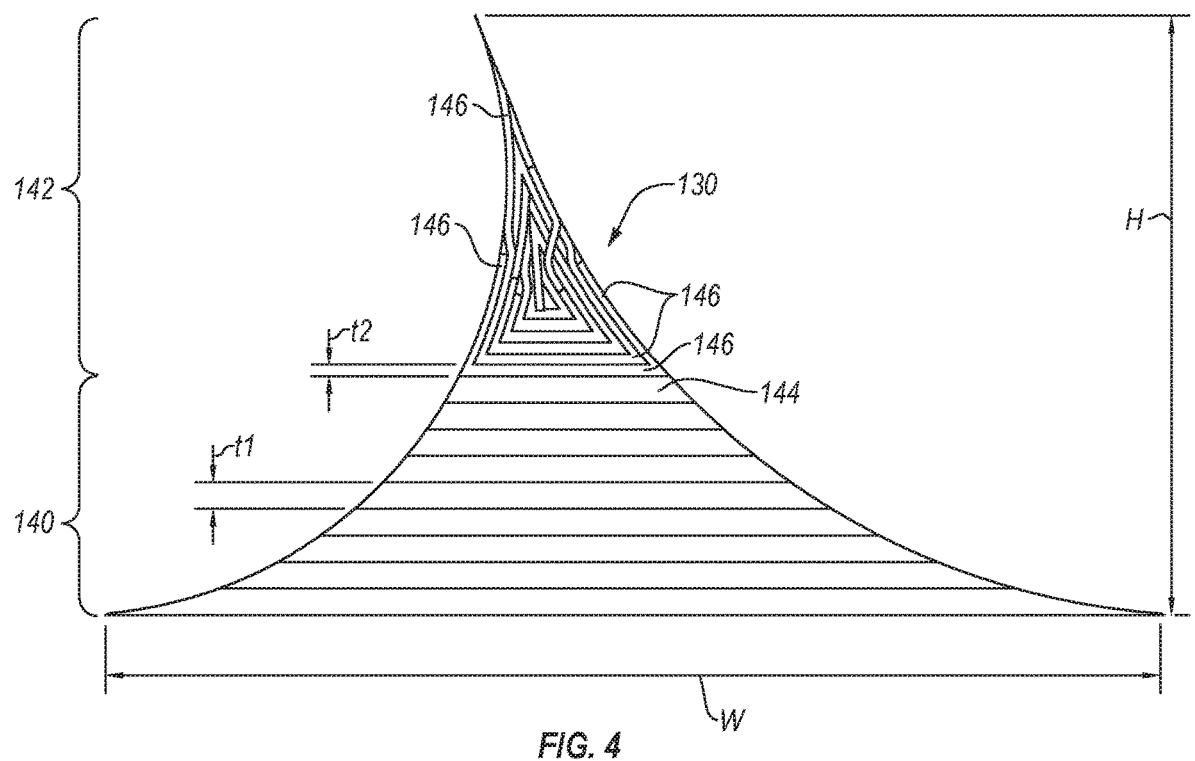
FIG. 4 is an end view of a noodle of a structural joint, according to one or more examples of the present disclosure.

Referring to FIG. 4, a particular implementation of the noodle 130 is shown. The noodle 130 includes a first portion 140 and a second portion 142. The first portion 140 includes a plurality of first composite plies 144 stacked on top of, or otherwise joined to, each other. Similarly, the second portion 142 includes a plurality of second composite plies 146, partially stacked on top of each other and compacted (e.g., bunched) against each other, or otherwise joined to, each other. As will be described in more detail below, the plurality of second composite plies 146 are initially aligned and stacked on top of each other, and then compacted or bunched together as they pass through a first forming station 168 of a system 150. The second portion 142 is stacked on, or otherwise joined to, the first portion 140 to form the noodle 130. In one example, the first portion 140 is a base of the noodle 130 and the second portion 142 is a tip of the noodle. The base of the noodle 130 is wider than the tip of the noodle 130. Moreover, the tip of the noodle 130 converges to an edge along a height H of the noodle 130.

Figure 5:
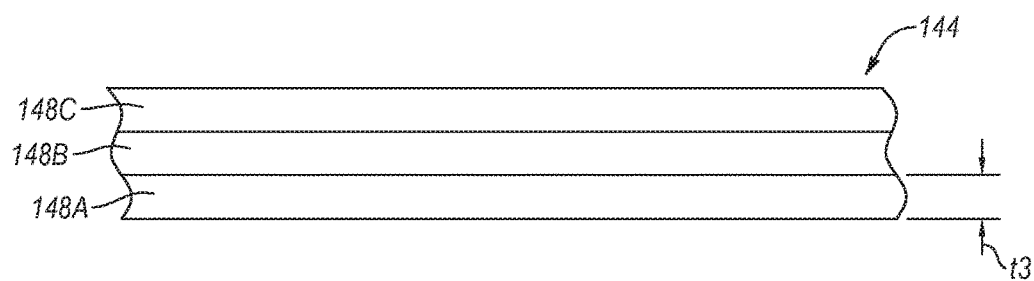
FIG. 5 is an end view of a composite sheet of a noodle of a structural joint, according to one or more examples of the present disclosure.

As shown in FIG. 5, in one implementation, each one of the plurality of first composite plies 144 includes multiple layers 148A-148C. Each layer of the multiple layers 148A-148C includes first unidirectional fibers embedded/suspended in a resin or covered in a thermoplastic veil. For each first composite ply 144, the direction of the first unidirectional fibers of each one of the multiple layers 148A-148C is different that the direction of the first unidirectional fibers of any other one of the multiple layers 148A-148C. As an example only, in one particular implementation, the first unidirectional fibers of the layer 148A are oriented in a −45° direction, the first unidirectional fibers of the layer 148B are oriented in a 0° direction, and the first unidirectional fibers of the layer 148A are oriented in a 45° direction. Although in the illustrated embodiment, each one of the plurality of first composite plies 144 is shown to have three layers 148A-148C, according to other embodiments, each of the plurality of first composite plies 144 has one layer, two layers, or more than three layers.

Each one of the plurality of second composite plies 146 includes only a single layer with second unidirectional fibers embedded/suspended in a resin or covered in a thermoplastic veil. The direction of the second unidirectional fibers of each one of the plurality of second composite plies 146 is the same. For example, in one implementation, the direction of the second unidirectional fibers of the plurality of second composite plies 146 is 0°. As will be explained in more detail below with regard to FIG. 6, and as used herein, the 0° direction is parallel to the pulling direction. The direction of the second unidirectional fibers of the plurality of second composite plies 146 can be the same as the direction of the first unidirectional fibers of one of the layers of the first composite plies 144. However, in certain implementations, the direction of the second unidirectional fibers of the plurality of second composite plies 146 can be different than the direction of the first unidirectional fibers of any one of the layers of the first composite plies 144. For example, the direction of the second unidirectional fibers of the plurality of second composite plies 146 can be 0°, the first unidirectional fibers of the layer 148A can be oriented in a −45° direction, the first unidirectional fibers of the layer 148B can be oriented in a 90° direction, and the first unidirectional fibers of the layer 148A can be oriented in a 45° direction.

The noodle 130 has a height H equal to the combined thicknesses t1, t2, respectively, of the first composite plies 144 and the second composite plies 146. Generally, the thickness t1 of each one of the first composite plies 144 is greater than the thickness t2 of each one of the second composite plies 146. In the illustrated the thickness t1 of each one of the first composite plies 144 is three times greater than the thickness t2 of each one of the second composite plies 146. Each of the first composite plies 144 and the second composite plies 146 has a width W. The width W of each of the first composite plies 144 and the second composite plies 146 decreases along the height H. Moreover, in certain implementations, any one of the first composite plies 144 of the first portion 140 (e.g., base) of the noodle 130 is wider than any one of the second composite plies 146 of the second portion 142 (e.g., tip). Additionally, in some implementations, the width W of any one of the first composite plies 144 and the second composite plies 146 is less than the width W of any lower adjacent composite ply. In other words, the width W of the noodle 130 progressively decreases along the height H of the noodle 130.

Figure 6:
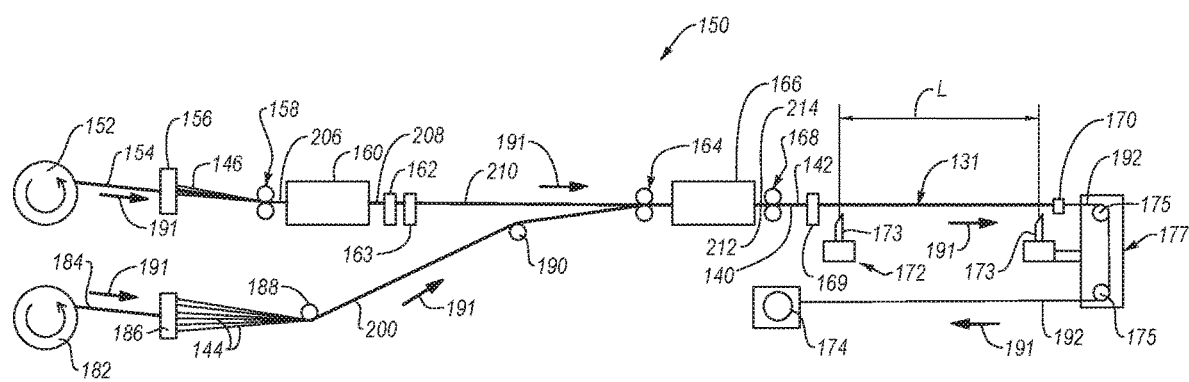
FIG. 6 is a schematic view of a system for manufacturing a noodle of a structural joint, according to one or more examples of the present disclosure.
Figure 7:
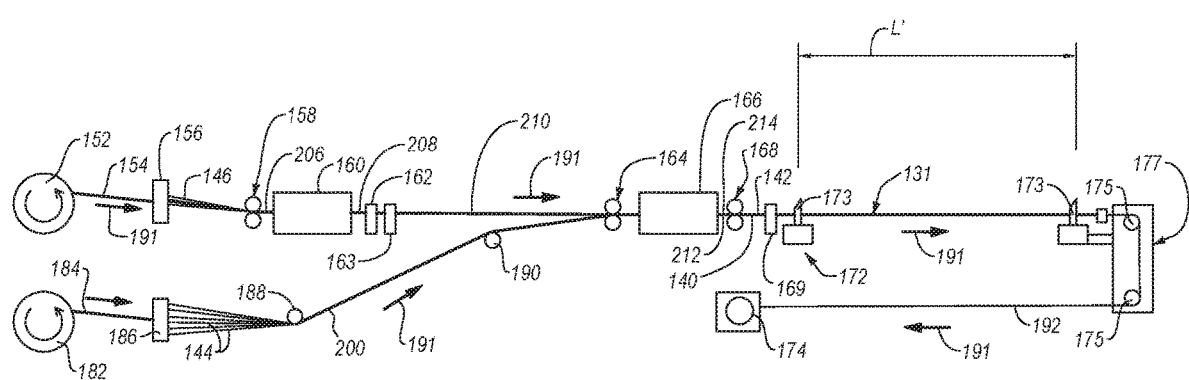
FIG. 7 is a schematic view of the system of FIG. 6, shown with a cutting station adjusted to accommodate a different pre-selected length of the noodle, according to one or more examples of the present disclosure.

Referring to FIGS. 6 and 7, a system 150 for manufacturing the noodle 130, according to one embodiment, is shown. The system 150 is configured to automatically produce a continuous noodle 131 and then cut the continuous noodle 131 to a pre-selected length L to form the noodle 130. Because the system 150 produces a continuous noodle 131, the tedious steps of separately cutting plies to length and width, manually aligning the plies, and attaching a pre-formed tip to a pre-formed base are avoided.

The system 150 includes a first material source 182 and a second material source 152. The first material source 182 includes a substantially continuous source of a first composite sheet 184. In one implementation, the first material source 182 is a roll of the first composite sheet 184. Similarly, the second material source 152 includes a substantially continuous source of a second composite sheet 154. In one implementation, the second material source 152 is a roll of the second composite sheet 154. The first composite sheet 184 and the second composite sheet 154 each has a continuous length and a given width. Moreover, the first composite sheet 184 has only a single composite ply and the second composite sheet 154 has only a single composite ply. The single composite ply of the first composite sheet 184 has multiple layers (e.g., layers 148A-148C) and the single composite ply of the second composite sheet 154 has only a single layer.

Generally, the first composite sheet 184 has the same composition as any one of the first composite plies 144 except that the first composite sheet 184 does not have pre-impregnated resin. Rather, the first composite sheet 184 is a "dry", non-impregnated, or B-stage composite sheet. The first unidirectional fibers of the first composite sheet 184 are retained in place relative to each other via a binder and/or thermoplastic veil encapsulating each one of the first unidirectional fibers. The binder and/or thermoplastic veil can be any of various thermoplastic adhesives. As used herein, the term "binder" can mean a binder, a thermoplastic veil, or a combination of both.

Similarly, the second composite sheet 154 has the same composition as any one of the second composite plies 146 except that the second composite sheet 154 does not have pre-impregnated resin. Rather, the second composite sheet 154 is a "dry", non-impregnated, or B-stage composite sheet. The second unidirectional fibers of the layers of the second composite sheet 154 are retained in place relative to each other via a binder or veil encapsulating each one of the first unidirectional fibers, which can be the same as or different than the binder of the first composite sheet 184.

The system 150 further includes a pull motor 174 and a tow cable 192. The tow cable 192 includes a first end, coupled to a pre-made or leading edge section of the continuous noodle 131, and a second end, opposite the first end, coupled to the pull motor 174. The pre-made section of the continuous noodle 131 can be fixed to the first end of the tow cable 192 by a clamp 170. The pull motor 174 is selectively operable to retract the tow cable 192 about a winch of the pull motor 174. As the tow cable 192 is retracted, the pre-made section of the continuous noodle 131 is pulled, in the directions indicated in by directional arrows in FIGS. 6 and 7. Because the continuous noodle 131 is continuous, or continuously made by the system 150, from the clamp 170 to the first material source 182 and the second material source 152, as the pre-made section is pulled toward the pull motor 174 the first composite sheet 184 and the second composite sheet 154 are continuously pulled off of the respective first material source 182 and the second material source 152 and continuously pulled through the system 150.

The system 150 further includes a first splitting station 186 that receives the first composite sheet 184 from the first material source 182. As the first composite sheet 184 is advanced (e.g., pulled) through the first splitting station 186 by the pull motor 174, the first splitting station 186 cuts the first composite sheet 184 into a plurality of first composite plies 144. The first splitting station 186 cuts each one of the first composite plies 144 to a width W that is different than any other one of the first composite plies 144. Moreover, referring to FIG. 8, in some implementations, the first splitting station 186 cuts the plurality of first composite plies 144 such that the widths W of the first composite plies 144 incrementally change (e.g., increases or decreases) from first composite ply to first composite ply laterally across the first splitting station 186 (e.g., in a direction perpendicular to a pulling direction 191 through the first splitting station 186).

The first splitting station 186 is stationary relative to the first composite sheet 184 being pulled through the first splitting station 186. In one implementation, the first splitting station 186 includes a die with a plurality of blades spaced apart from each other by distances corresponding to the widths W of the first composite plies 144. Accordingly, the distances between the blades incrementally change from blade to blade laterally across the first splitting station 186. In certain implementations, the distances between the blades of the first splitting station 186 are adjustable to adjust the widths W of the first composite plies 144 for manufacturing differently sized and shaped noodles.

Figure 8:
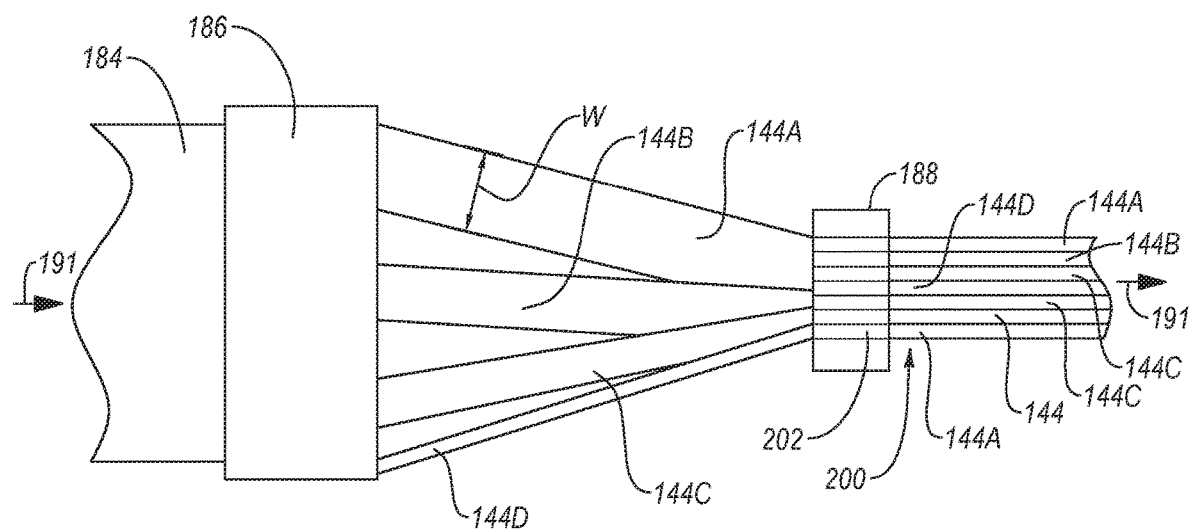
FIG. 8 is a top plan view of a splitting station and an alignment station of a system for manufacturing a noodle of a structural joint, according to one or more examples of the present disclosure.

The system 150 further includes a first alignment station 188 that receives the first composite plies 144 from the first splitting station 186. As the first composite plies 144 are advanced through the first alignment station 188 by the pull motor 174, the first alignment station 188 stacks the first composite plies 144, effectively on top of each other in descending order based on width, to form a first stacked composite layup 200. The first alignment station 188 is configured to align the first composite plies 144 in a direction perpendicular to the pulling direction 191 and order the first composite plies 144 from widest to narrowest. For example, as shown in FIG. 8, composite ply 144D, being cut by the first splitting station 186 to have a width W smaller than that of composite ply 144C, is aligned on top of composite ply 144C. Similarly, composite ply 144C, being cut by the first splitting station 186 to have a width W smaller than that of composite ply 144B, is aligned on top of composite ply 144B. Finally, composite ply 144B, being cut by the first splitting station 186 to have a width W smaller than that of composite ply 144A, is aligned on top of composite ply 144A. Depending on the desired cross-sectional shape of the noodle 130, the first alignment station 188 may vertically align the midpoints of the first composite plies 144 such that the first composite plies 144 are symmetrically stacked or vertically misalign the midpoints of the first composite plies 144 such that the first composite plies 144 are asymmetrically stacked.

In one implementation, the first alignment station 188 is a roller (or rollers) that has stacked channels 202 formed into the roller. Each one of the stacked channels 202 receives a respective one of the first composite plies 144 from the first splitting station 186. The stacked channels 202 are ordered and aligned in a manner corresponding to the desired order and alignment of the first composite plies 144 of the first stacked composite layup 200. As the first composite plies 144 are pulled through the first alignment station 188, the first alignment station 188 rolls to continuously receive, order, and align the first composite plies 144. Alternatively, in some implementations, the first alignment station 188 is not a roller, but is a non-movable object with stacked orifices that receive, order, and align the first composite plies 144 as the plies pass through the stacked orifices.

Referring back to FIGS. 7 and 8, in some implementations, the system 150 further includes a redirection station 190 that redirects the first stacked composite layup 200 in preparation for further downstream processing. The redirection station 190 can be a roller or other guide that receives the first stacked composite layup 200 and adjusts the direction of the first stacked composite layup 200 leaving the redirection station 190 relative to the first stacked composite layup 200 entering the redirection station 190. Although one redirection station 190 is shown, in some implementations, additional redirection stations 190 can be used as desired. Alternatively, in certain implementations, the system 150 has no redirection stations.

The system 150 further includes a second splitting station 156 that receives the second composite sheet 154 from the second material source 152. As the second composite sheet 154 is advanced (e.g., pulled) through the second splitting station 156 by the pull motor 174, the second splitting station 156 cuts the second composite sheet 154 into a plurality of second composite plies 146. The second splitting station 156 cuts each one of the second composite plies 146 to a width W that is the same as or different than any other one of the second composite plies 146. In one implementation, referring to FIG. 9, in some implementations, the second splitting station 156 cuts the plurality of second composite plies 146 such that the widths W of the second composite plies 146 incrementally change (e.g., increases or decreases) from second composite ply to second composite ply laterally across the second splitting station 156 (e.g., in a direction perpendicular to a pulling direction 191 through the second splitting station 156).

The second splitting station 156 is stationary relative to the second composite sheet 154 being pulled through the second splitting station 156. In one implementation, the second splitting station 156 includes a die with a plurality of blades spaced apart from each other by distances corresponding to the widths W of the second composite plies 146. Accordingly, at least in the illustrated implementation, the distances between the blades incrementally change from blade to blade laterally across the second splitting station 156. However, in other implementations, the distances between the blades are the same from blade to blade laterally across the second splitting station 156. In certain implementations, the distances between the blades of the second splitting station 156 are adjustable to adjust the widths W of the second composite plies 146 for manufacturing differently sized and shaped noodles.

Figure 9:
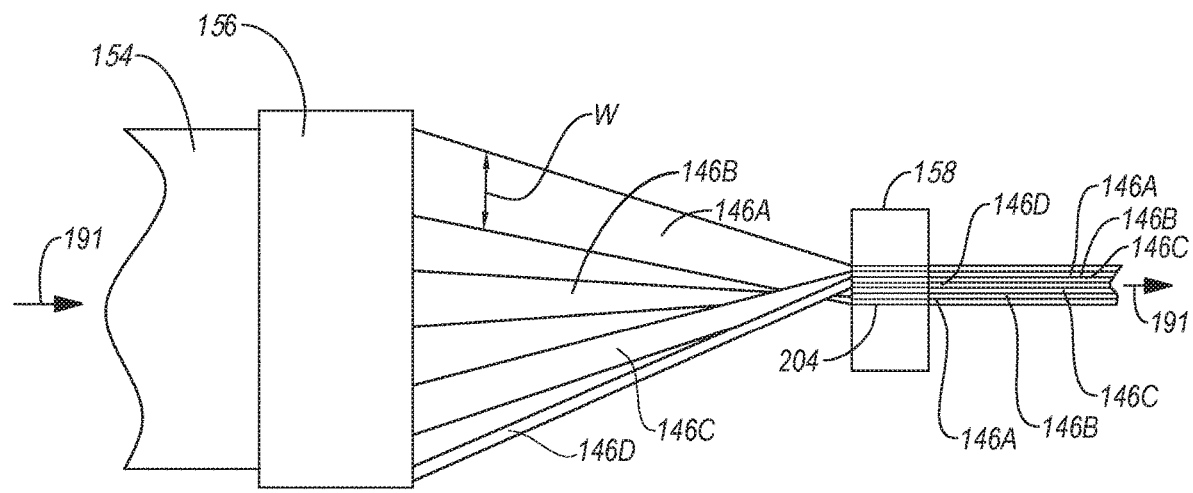
FIG. 9 is a top plan view of a splitting station and an alignment station of a system for manufacturing a noodle of a structural joint, according to one or more examples of the present disclosure.

The system 150 further includes a second alignment station 158 that receives the second composite plies 146 from the second splitting station 156. As the second composite plies 146 are advanced through the second alignment station 158 by the pull motor 174, the second alignment station 158 stacks the second composite plies 146, effectively on top of each other. In one implementation, where the widths of the second composite plies 146 are different, the second composite plies 146 are stacked on top of each other in descending order based on width, to form a second stacked composite layup 206. The second alignment station 158 is configured to align the second composite plies 146 in a direction perpendicular to the pulling direction 191. Additionally, in some implementations, where the widths of the second composite plies 146 are different, the second alignment station 158 orders the second composite plies 146 from widest to narrowest. For example, as shown in FIG. 9, composite ply 146D, being cut by the second splitting station 156 to have a width W smaller than that of composite ply 146C, is aligned on top of composite ply 146C. Additionally, composite ply 146C, being cut by the second splitting station 156 to have a width W smaller than that of composite ply 146B, is aligned on top of composite ply 146B. Finally, composite ply 146B, being cut by the second splitting station 156 to have a width W smaller than that of composite ply 146A, is aligned on top of composite ply 146A. Although shown as having different widths W, the composite plies 146A-146D can have the same widths in some implementations. Depending on the desired cross-sectional shape of the second portion 142 of the noodle 130, the second alignment station 158 may vertically align the midpoints of the second composite plies 146 such that the second composite plies 146 are symmetrically stacked or, if the composite plies 146 vary in width, vertically misalign the midpoints of the second composite plies 146 such that the second composite plies 146 are asymmetrically stacked.

In one implementation, the second alignment station 158 includes rollers (or a roller) that has opposing stacked channels 204 formed into the rollers. Each one of the stacked channels 204 receives a respective one of the second composite plies 146 from the second splitting station 156. The stacked channels 204 are ordered and aligned in a manner corresponding to the desired order and alignment of the second composite plies 146 of the second stacked composite layup 206. As the second composite plies 146 are pulled through the second alignment station 158, the second alignment station 158 rolls to continuously receive, order, and align the second composite plies 146. Alternatively, in some implementations, the second alignment station 158 is not a roller, but is a non-movable object with stacked orifices that receive, order, and align the second composite plies 146 as the plies pass through the stacked orifices.

Referring back to FIGS. 6 and 7, the system 150 additionally includes a second heating station 160 that receives the second stacked composite layup 206 from the second alignment station 158. As the second stacked composite layup 206 is advanced through the second heating station 160 by the pull motor 174, the second heating station 160 heats the second stacked composite layup 206 to form a second heated composite layup 208. The second heating station 160 is configured to heat the second stacked composite layup 206 to a temperature sufficient to at least partially melt the binder in the second composite plies 146 of the second stacked composite layup 206. In one implementation, the temperature is the melting temperature of the binder. Partially melting the binder in the second stacked composite layup 206 converts the binder into a tacky state, which promotes adhesion and consolidation between the unidirectional fibers of the second stacked composite layup 206. Additionally, partially melting the binder promotes malleability of the binder, which places the second heated composite layup 208 in a state conducive to forming and shaping by a second forming station 162 of the system 150.

The second heating station 160 can be a conveyor-type heater configured to heat the second stacked composite layup 206 as it is pulled through the heater. Moreover, the second heating station 160 can utilize any of various types of heating methods, such as convective, radiative, infrared, etc., to heat the second stacked composite layup 206. The temperature to which the second stacked composite layup 206 is heated by the second heating station 160 depends on the melting temperature of the binder in the second stacked composite layup 206. In one implementation, the second heating station 160 heats the second stacked composite layup 206 to a temperature just less than the melting temperature of the binder.

The second forming station 162 receives the second heated composite layup 208 from the second heating station 160. As the second heated composite layup 208 is advanced through the second forming station 162 by the pull motor 174, the second forming station 162 shapes and compacts the second heated composite layup 208 into a second pre-selected cross-sectional shape to form an intermediate composite layup 210. In some implementations, the second forming station 162 is a fixed orifice die. An orifice of the fixed orifice die has the second pre-selected cross-sectional shape. As the second heated composite layup 208 passes through the orifice, the hard walls of the die, defining the orifice, contact the second heated composite layup 208 and cause the second heated composite layup 208 to at least partially compress and consolidate into the second pre-selected cross-sectional shape.

The system 150 also includes a second cooling station 163 that receives the intermediate composite layup 210 from the second forming station 162. As the intermediate composite layup 210 is advanced through the second cooling station 163 by the pull motor 174, the second cooling station 163 rapidly cools the intermediate composite layup 210 to reduce the temperature of the binder and fix the shape of the intermediate composite layup 210. The second cooling station 163 can include any of various devices for rapidly cooling (e.g., quenching) the intermediate composite layup 210. For example, in some implementations, the second cooling station 163 includes an air blast device capable of directing a blast of air at the intermediate composite layup 210 upon exiting the second forming station 162. In other implementations, the second cooling station 163 includes a watercooling die, water blast device, or other cooling device.

The system 150 further includes a third alignment station 164 that receives the first stacked composite layup 200 from the first alignment station 188 (or the redirection station 190) and the intermediate composite layup 210 from the second forming station 162 (or the second cooling station 163). As the first stacked composite layup 200 and the intermediate composite layup 210 are advanced through the third alignment station 164 by the pull motor 174, the third alignment station 164 stacks the intermediate composite layup 210 effectively on top of the first stacked composite layup 200. The third alignment station 164 is configured to align the intermediate composite layup 210 with the first stacked composite layup 200 in a direction perpendicular to the pulling direction 191.

In one implementation, the third alignment station 164 includes rollers (or a roller) with channels. The channels are aligned in a manner corresponding to the desired alignment of the intermediate composite layup 210 and the first stacked composite layup 200. As the intermediate composite layup 210 and the first stacked composite layup 200 are pulled through the third alignment station 164, the third alignment station 164 rolls to continuously receive and align the intermediate composite layup 210 and the first stacked composite layup 200. Alternatively, in some implementations, the third alignment station 164 is not a roller, but is a non-movable object with stacked orifices that receive and align the intermediate composite layup 210 and the first stacked composite layup 200 as they pass through the stacked orifices.

The system 150 additionally includes a first heating station 166 that receives the intermediate composite layup 210 and the first stacked composite layup 200, now aligned, from the third alignment station 164. As the aligned intermediate composite layup 210 and the first stacked composite layup 200 is advanced through the first heating station 166 by the pull motor 174, the first heating station 166 heats the intermediate composite layup 210 and the first stacked composite layup 200 to form a first heated composite layup 212 and a heated intermediate composite layup 214, respectively. The first heating station 166 is configured to heat the first stacked composite layup 200 to a temperature sufficient to at least partially melt the binder in the second composite plies 144 of the first stacked composite layup 200. In one implementation, the temperature is the melting temperature of the binder. Partially melting the binder in the first stacked composite layup 200 converts the binder into a tacky state, which promotes adhesion and consolidation between the unidirectional fibers of the second stacked composite layup 200. Additionally, partially melting the binder promotes malleability of the binder, which places the first heated composite layup 212 in a state conducive to forming and shaping by a first forming station 168 of the system 150. The first heating station 166 also heats the intermediate composite layup 210 to a temperature sufficient to at least partially re-melt the binder in the intermediate composite layup 210 to again convert the binder into a tacky state. In one implementation, the temperature is the melting temperature of the binder. Furthermore, the at least partially melted binders of the intermediate composite layup 210 and the first stacked composite layup 200 at least partially meld together to stick together the first heated composite layup 212 and the heated intermediate composite layup 214. Like the second heating station 160, the first heating station 166 can be a conveyor-type heater configured to heat the intermediate composite layup 210 and the first stacked composite layup 200 as they are pulled through the heater.

The first forming station 168 receives the first heated composite layup 212 and the heated intermediate composite layup 214 from the first heating station 166. As the first heated composite layup 212 and the heated intermediate composite layup 214 are advanced through the first forming station 168 by the pull motor 174, the first forming station 168 concurrently shapes and consolidates the first heated composite layup 212 into a first pre-selected cross-sectional shape to form the first portion 140 of the continuous noodle 131 and further shapes, compacts, and consolidates the heated intermediate composite layup 214 into a third pre-selected cross-sectional shape to form the second portion 142 of the continuous noodle 131. In some implementations, the first forming station 168 is a rolling die with an orifice, having a final pre-selected cross-sectional shape of the noodle 130, formed between the opposing rollers of the rolling die (e.g., an upper section of the rolling die shapes and consolidates the second portion 142 and a lower section of the rolling die shape and consolidates the first portion 140). As the first heated composite layup 212 and the heated intermediate composite layup 214 pass through the orifice, the hard walls of the rolling die, defining the orifice, cause the first heated composite layup 212 and the heated intermediate composite layup 214 to at least partially compress and consolidate together into the final pre-selected cross-sectional shape of the noodle 130.

The system 150 also includes a first cooling station 169 that receives the first portion 140 and the second portion 142 from the first forming station 168. As the first portion 140 and the second portion 142 are advanced through the first cooling station 169 by the pull motor 174, the first cooling station 169 rapidly cools the first portion 140 and the second portion 142 to reduce the temperature of the binder and fix the shape of the first portion 140 and the second portion 142. Once fixed, the first portion 140 and the second portion 142 form the continuous noodle 131. The first cooling station 169 can be configured similarly to the second cooling station 163.

The system 150 additionally includes a cutting station 172 that receives the continuous noodle 131 (i.e., the first portion 140 and the second portion 142 of the continuous noodle 131) from the first cooling station 169. The cutting station 172 is located near an exit of the first cooling station 169. The continuous noodle 131 is pulled through the cutting station 172, which cuts the continuous noodle 131 to a pre-selected length L to form the noodle 130. Once cut, the first portion 140 and the second portion 142 of the continuous noodle 131 effectively become the first portion 140 and the second portion 142 of noodle 130.

The cutting station 172 is adjustable to adjust the pre-selected length L. Accordingly, the cutting station 172 is operable to cut multiple noodles 130, each with different lengths, from the same continuous noodle 131. As shown in FIGS. 6 and 7, in one implementation, the cutting station 172 includes two rollers 175 spaced apart a fixed distance in a direction perpendicular or oblique to the pull direction 191. The two rollers 175, being positioned relative to each other in this manner, allow the tow cable 192 to reverse its direction, which further allows the pull motor 174 to be mounted near the control area of the system 150. The rollers 175 form part of a length adjustment assembly 177. The length adjustment assembly 177 is movable parallel to the pulling direction 192 to adjust a distance between the rollers 175 and the first cooling station 169. Co-movably attached to the length adjustment assembly 177 is one of two blades 173. The other of the blades 173 is located a fixed distance from the first cooling station 169. Accordingly, as the length adjustment assembly 177 is moved, a distance between the two blades 173 changes. For example, in FIG. 6, the two blades 173 are separated by a length L, associated with a desired length L of the noodle 130. Then, in FIG. 7, the length adjustment assembly 177 is positioned further away from the first cooling station 169 such that the two blades 173 are separated by a length L', associated with a desired length L' of the noodle 130. The length L is greater than the length L'. In one implementation, the length adjustment assembly 177, as well as the blade 173 co-movably fixed to the length adjustment assembly 177, moves along a rail (not shown).

When a distance between the two blades 173 is adjusted to equal a pre-selected length of the noodle 130 (as shown in FIG. 7 the pre-selected length is equal to the length L'), the blades 173 are actuated to cut through the continuous noodle 131 to produce a noodle 130 with the pre-selected length. After a noodle 130 with a pre-selected length is cut using the cutting station 172, the noodle 130 and two or more layers of composite material are arranged relative to each other according to a desired configuration of the structural joint 120. Resin is then infused into the noodle 130, including the first portion 140 and the second portion 142 of the noodle 130, as well as the two or more layers. The resin is subsequently cured, through the application of heat, to form the structural joint 120.

The system 150 may further include an electronic controller configured to automatically control operation of the system 150. For example, the electronic controller can control the pull motor 174 to automatically pull the continuous noodle 131 through the system 150 at a desired one of various rates. In some implementations, the rate at which the continuous noodle 131 is pulled through the system 150 is adjusted to compensate for delays (e.g., lag) in the response of the first heating station 166 and the second heating station 160. Additionally, the electronic controller can control the cutting station 172 to automatically adjust the length at which the continuous noodle 131 is cut. Also, the electronic controller can control the heating stations 160, 166 to automatically adjust the amount of heat generated by the heating stations 160, 166. For example, the heat generated by the heating stations 160, 166 is based on the speed at which the continuous noodle 131 is pulled through the system 150 in some implementations. As yet another example, the electronic controller can control the splitting stations 156, 186 to automatically adjust the widths at which the composite sheets 154, 184 are cut.

Figure 10:
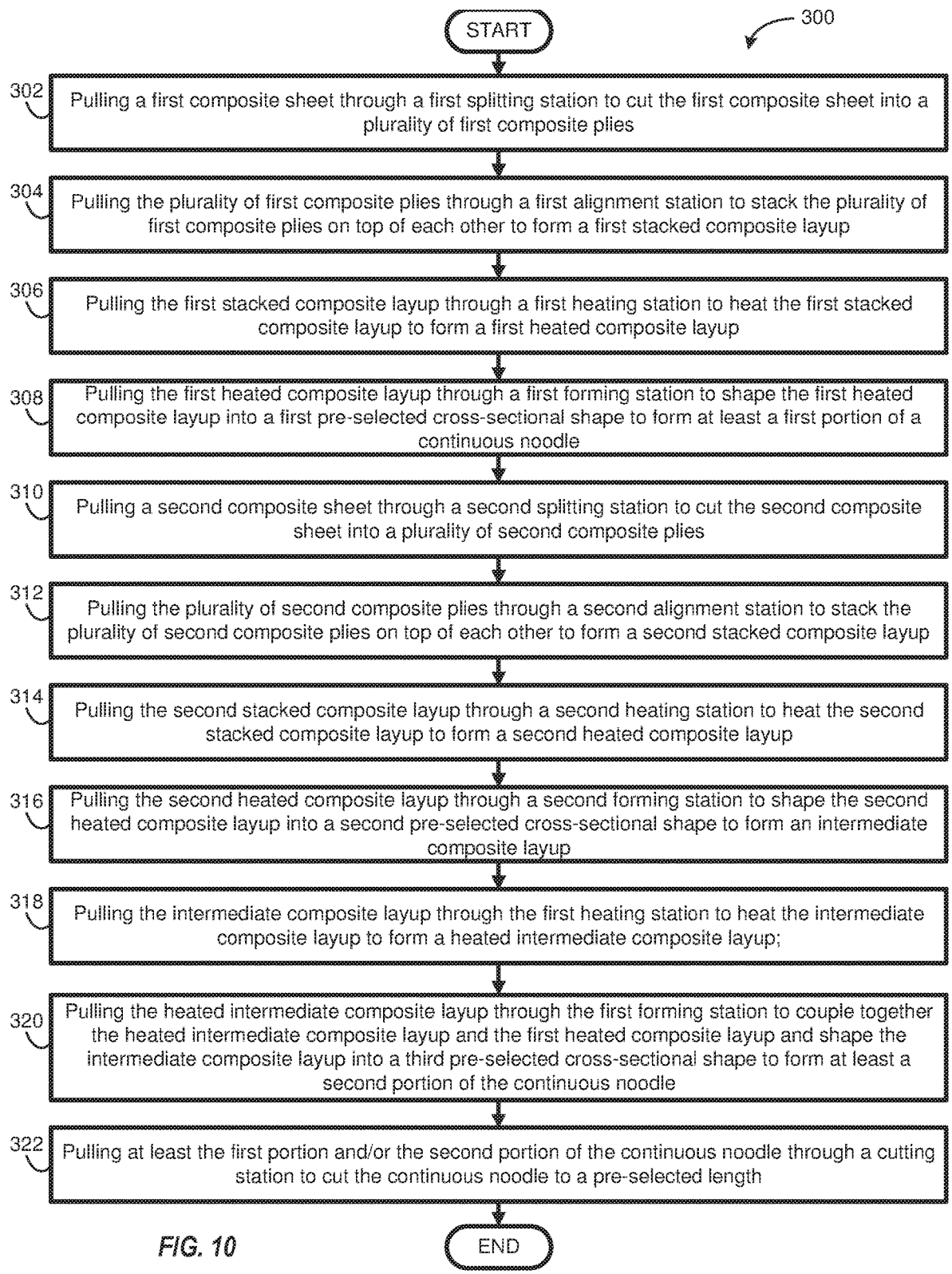
FIG. 10 is a schematic flow chart of a method of manufacturing a noodle of a structural joint, according to one or more examples of the present disclosure.

Referring to FIG. 10, one embodiment of a method 300 of manufacturing a noodle, such as the noodle 130, of a structural joint, such as the structural joints 120, 121, is shown. The method 300 includes pulling a first composite sheet through a first splitting station to cut the first composite sheet into a plurality of first composite plies, each having a different width, at step 302. The method 300 also includes pulling the plurality of first composite plies through a first alignment station to stack the plurality of first composite plies on top of each other to form a first stacked composite layup at step 304. The method 300 further includes pulling the first stacked composite layup through a first heating station to heat the first stacked composite layup to form a first heated composite layup at step 306. The method 300 also includes pulling the first heated composite layup through a first forming station to shape the first heated composite layup into a first pre-selected cross-sectional shape to form at least a first portion of a continuous noodle at step 308. The method 300 additionally includes pulling at least the first portion of the continuous noodle through a cutting station to cut at least the first portion of the continuous noodle to a pre-selected length at step 322.

According to some embodiments, the method 300 further includes pulling a second composite sheet through a second splitting station to cut the second composite sheet into a plurality of second composite plies, each having a different width, at step 310. The method 300 also includes pulling the plurality of second composite plies through a second alignment station to stack the plurality of second composite plies on top of each other to form a second stacked composite layup at step 312. The method 300 additionally includes pulling the second stacked composite layup through a second heating station to heat the second stacked composite layup to form a second heated composite layup at step 314. The method 300 further includes pulling the second heated composite layup through a second forming station to shape the second heated composite layup into a second pre-selected cross-sectional shape to form an intermediate composite layup at step 316. The method 300 also includes pulling the intermediate composite layup through the first heating station to heat the intermediate composite layup to form a heated intermediate composite layup at step 318. The method 300 additionally includes pulling the heated intermediate composite layup through the first forming station to couple together the heated intermediate composite layup and the first heated composite layup and shape the intermediate composite layup into a third pre-selected cross-sectional shape to form at least a second portion of the continuous noodle at step 320. The method 300 further includes pulling at least the second portion of the continuous noodle, together with at least the first portion of the continuous noodle, through the cutting station to concurrently cut at least the first portion and the second portion of the continuous noodle to the pre-selected length at step 322.

In the above description, certain terms may be used such as "up," "down," "upper," "lower," "horizontal," "vertical," "left," "right," "over," "under" and the like. These terms are used, where applicable, to provide some clarity of description when dealing with relative relationships. But, these terms are not intended to imply absolute relationships, positions, and/or orientations. For example, with respect to an object, an "upper" surface can become a "lower" surface simply by turning the object over. Nevertheless, it is still the same object. Further, the terms "including," "comprising," "having," and variations thereof mean "including but not limited to" unless expressly specified otherwise. An enumerated listing of items does not imply that any or all of the items are mutually exclusive and/or mutually inclusive, unless expressly specified otherwise. The terms "a," "an," and "the" also refer to "one or more" unless expressly specified otherwise. Further, the term "plurality" can be defined as "at least two." Moreover, unless otherwise noted, as defined herein a plurality of particular features does not necessarily mean every particular feature of an entire set or class of the particular features.

Additionally, instances in this specification where one element is "coupled" to another element can include direct and indirect coupling. Direct coupling can be defined as one element coupled to and in some contact with another element. Indirect coupling can be defined as coupling between two elements not in direct contact with each other, but having one or more additional elements between the coupled elements. Further, as used herein, securing one element to another element can include direct securing and indirect securing. Additionally, as used herein, "adjacent" does not necessarily denote contact. For example, one element can be adjacent another element without being in contact with that element.

As used herein, the phrase "at least one of", when used with a list of items, means different combinations of one or more of the listed items may be used and only one of the items in the list may be needed. The item may be a particular object, thing, or category. In other words, "at least one of" means any combination of items or number of items may be used from the list, but not all of the items in the list may be required. For example, "at least one of item A, item B, and item C" may mean item A; item A and item B; item B; item A, item B, and item C; or item B and item C. In some cases, "at least one of item A, item B, and item C" may mean, for example, without limitation, two of item A, one of item B, and ten of item C; four of item B and seven of item C; or some other suitable combination.

Unless otherwise indicated, the terms "first," "second," etc. are used herein merely as labels, and are not intended to impose ordinal, positional, or hierarchical requirements on the items to which these terms refer. Moreover, reference to, e.g., a "second" item does not require or preclude the existence of, e.g., a "first" or lower-numbered item, and/or, e.g., a "third" or higher-numbered item.

As used herein, a system, apparatus, structure, article, element, component, or hardware "configured to" perform a specified function is indeed capable of performing the specified function without any alteration, rather than merely having potential to perform the specified function after further modification. In other words, the system, apparatus, structure, article, element, component, or hardware "configured to" perform a specified function is specifically selected, created, implemented, utilized, programmed, and/or designed for the purpose of performing the specified function. As used herein, "configured to" denotes existing characteristics of a system, apparatus, structure, article, element, component, or hardware which enable the system, apparatus, structure, article, element, component, or hardware to perform the specified function without further modification. For purposes of this disclosure, a system, apparatus, structure, article, element, component, or hardware described as being "configured to" perform a particular function may additionally or alternatively be described as being "adapted to" and/or as being "operative to" perform that function.

The schematic flow chart diagrams included herein are generally set forth as logical flow chart diagrams. As such, the depicted order and labeled steps are indicative of one embodiment of the presented method. Other steps and methods may be conceived that are equivalent in function, logic, or effect to one or more steps, or portions thereof, of the illustrated method. Additionally, the format and symbols employed are provided to explain the logical steps of the method and are understood not to limit the scope of the method. Although various arrow types and line types may be employed in the flow chart diagrams, they are understood not to limit the scope of the corresponding method. Indeed, some arrows or other connectors may be used to indicate only the logical flow of the method. For instance, an arrow may indicate a waiting or monitoring period of unspecified duration between enumerated steps of the depicted method. Additionally, the order in which a particular method occurs may or may not strictly adhere to the order of the corresponding steps shown.

The present subject matter may be embodied in other specific forms without departing from its spirit or essential characteristics. The described embodiments are to be considered in all respects only as illustrative and not restrictive. All changes which come within the meaning and range of equivalency of the claims are to be embraced within their scope.

What is claimed is:

1. A system for manufacturing a noodle of a structural joint, comprising:
    a first splitting station configured to cut a first composite sheet into a plurality of first composite plies, each having a different width, as the first composite sheet is advanced through the first splitting station;
    a first alignment station configured to stack the plurality of first composite plies on top of each other to form a first stacked composite layup as the plurality of first composite plies is advanced through the first alignment station;
    a first heating station configured to heat the first stacked composite layup to form a first heated composite layup as the first stacked composite layup is advanced through the first heating station;
    a first forming station configured to shape the first heated composite layup into a first pre-selected cross-sectional shape to form at least a first portion of a continuous noodle as the first heated composite layup is advanced through the first forming station;
    a cutting station configured to cut at least the first portion of the continuous noodle to a pre-selected length;
    a second splitting station configured to cut a second composite sheet into a plurality of second composite plies as the second composite sheet is advanced through the second splitting station;
    a second alignment station configured to stack the plurality of second composite plies on top of each other to form a second stacked composite layup as the plurality of second composite plies are advanced through the second splitting station;
    a second heating station configured to heat the second stacked composite layup to form a second heated composite layup as the second stacked composite layup is advanced through the second heating station;
    a second forming station configured to shape the second heated composite layup into a second pre-selected cross-sectional shave to form an intermediate composite layup as the second heated composite layup is advanced through the second forming station;
    wherein:
        the first heating station is further configured to heat the intermediate composite layup to form a heated intermediate composite layup as the intermediate composite layup is advanced through the first heating station;
        the first forming station is further configured to couple together the heated intermediate composite layup and the first heated composite layup and shape the intermediate composite layup into a third pre-selected cross-sectional shape to form at least a second portion of the continuous noodle as the heated intermediate composite layup and the first heated composite layup are advanced through the first forming station; and
        the cutting station is further configured to concurrently cut at least the first portion and the second portion of the continuous noodle to the pre-selected length.

2. The system according to claim 1, further comprising a third alignment station configured to stack the intermediate composite layup onto the first stacked composite layup as the intermediate composite layup and the first stacked composite layup advance through the third alignment station.

3. The system according to claim 1, further comprising:
    a first cooling station configured to rapidly cool at least the first portion and the second portion of the continuous noodle; and
    a second cooling station configured to rapidly cool the second heated composite layup.

4. The system according to claim 1, wherein the second forming station comprises a fixed orifice die.

5. The system according to claim 1, further comprising a pull motor configured to concurrently advance the first composite sheet through the first splitting station, the plurality of first composite plies through the first alignment station, the first stacked composite layup and the intermediate composite layup through the first heating station, the first heated composite layup and the heated intermediate composite layup through the first forming station, the second composite sheet through the second splitting station, the plurality of second composite plies through the second splitting station, the second stacked composite layup through the second heating station, the second heated composite layup through the second forming station, and the continuous noodle through the cutting station.

6. The system according to claim 5, further comprising a tow cable, comprising a first end coupleable to the continuous noodle and a second end, opposite the first end, coupled to the pull motor, wherein the pull motor is configured to concurrently advance the first composite sheet through the first splitting station, the plurality of first composite plies through the first alignment station, the first stacked composite layup and the intermediate composite layup through the first heating station, the first heated composite layup and the heated intermediate composite layup through the first forming station, the second composite sheet through the second splitting station, the plurality of second composite plies through the second splitting station, the second stacked composite layup through the second heating station, the second heated composite layup through the second forming station, and the continuous noodle through the cutting station by pulling the tow cable.

7. The system according to claim 1, wherein the cutting station is adjustable to adjust the pre-selected length.

8. The system according to claim 1, wherein the first forming station comprises a rolling die.

9. The system according to claim 1, wherein the first forming station is configured:
   to bunch together the second composite plies in a multi-directional manner to form the second portion of the continuous noodle; and
   to maintain the first composite plies in a single directional manner to form the first portion of the continuous noodle.

10. The system according to claim 9, wherein the first forming station is configured to form the second composite plies into a tip of the continuous noodle.

11. The system according to claim 1, wherein the first forming station is configured to form the first composite plies into a tip of the continuous noodle.

12. The system according to claim 1, wherein:
   the first heated composite layup is advanced through the first forming station in a pull direction;
   the system further comprises two rollers downstream of the first forming station and spaced apart in a direction perpendicular or oblique to the pull direction;
   the system further comprises a tow cable coupled to the first heated composite layup and engaged with the tow cable; and
   wherein the two rollers are configured to reverse the direction of the tow cable.

13. The system according to claim 12, wherein:
   the cutting station comprises two blades;
   the system further comprises a length adjustment assembly that comprises a first one of the two blades and is movable relative to a second one of the two blades to adjust a distance between the two blades; and
   the two rollers are fixed relative to the first one of the two blades.

14. The system according to claim 13, further comprising a pull motor configured to advance the first composite sheet through the first splitting station, advance the plurality of first composite plies through the first alignment station, advance the first stacked composite layup through the first heating station, and advance first heated composite layup through the first forming station via advancement of the tow cable, wherein the pull motor is positioned closer to the first splitting station, the first alignment station, the first heating station, and the first forming station than the first one of the two blades.

15. The system according to claim 1, wherein the first alignment station comprises stacked channels each configured to receive a respective one of the plurality of first composite plies.

16. The system according to claim 15, wherein the first alignment station comprises a roller and the stacked channels are formed in the roller.

17. The system according to claim 1, wherein the first splitting station comprises a plurality of blades spaced apart from each other by distances corresponding to the widths of the plurality of first composite plies.

18. The system according to claim 17, wherein the distances between the plurality of blades are adjustable to adjust the widths of the plurality of first composite plies.

19. The system according to claim 1, wherein the first alignment station is further configured to stack the plurality of first composite plies on top of each other from least wide to most wide.

20. A system for manufacturing a noodle of a structural joint, comprising:
   a first splitting station configured to cut a first composite sheet into a plurality of first composite plies, each having a different width, as the first composite sheet is advanced through the first splitting station;
   a first alignment station configured to stack the plurality of first composite plies on top of each other to form a first stacked composite layup as the plurality of first composite plies is advanced through the first alignment station;
   a first heating station configured to heat the first stacked composite layup to form a first heated composite layup as the first stacked composite layup is advanced through the first heating station, wherein the first heated composite layup is advanced through the first forming station in a pull direction;
   a first forming station configured to shape the first heated composite layup into a first pre-selected cross-sectional shape to form at least a first portion of a continuous noodle as the first heated composite layup is advanced through the first forming station;
   two rollers downstream of the first forming station and spaced apart in a direction perpendicular or oblique to the pull direction;
   a tow cable coupled to the first heated composite layup and engaged with the tow cable, wherein the two rollers are configured to reverse the direction of the tow cable; and
   a cutting station configured to cut at least the first portion of the continuous noodle to a pre-selected length.

* * * * *